United States Patent [19]

Harms et al.

[11] Patent Number: 5,035,290
[45] Date of Patent: Jul. 30, 1991

[54] HEIGHT SENSING DEVICE INCLUDING AN ULTRASONIC SENSOR AND A MECHANICAL SENSOR

[75] Inventors: Paul Harms; Willibald Sehr, both of Hadamar-Steinbach, Fed. Rep. of Germany

[73] Assignee: MOBA-Electronic Gesellschaft fur Mobil-Automation mbh, Elz, Fed. Rep. of Germany

[21] Appl. No.: 428,218

[22] Filed: Oct. 27, 1989

[51] Int. Cl.⁵ ............................................... E02F 3/84
[52] U.S. Cl. ........................................ 172/1; 172/4.5; 37/DIG. 20; 37/DIG. 1; 367/96
[58] Field of Search ................. 172/2, 4, 4.5; 299/1; 37/DIG. 1, DIG. 20, 108 R; 404/84; 364/424.07; 367/87, 95, 96

[56] References Cited

U.S. PATENT DOCUMENTS

| | | | |
|---|---|---|---|
| 3,514,630 | 5/1970 | Steele et al. | 172/4.5 X |
| 3,786,871 | 1/1974 | Long et al. | 37/DIG. 20 X |
| 3,999,314 | 12/1976 | Miller et al. | 37/DIG. 20 X |
| 4,733,355 | 3/1988 | Davidson et al. | 172/4.5 X |

Primary Examiner—Dennis L. Taylor
Assistant Examiner—Jeffrey L. Thompson
Attorney, Agent, or Firm—Wolf, Greenfield & Sacks

[57] ABSTRACT

A height-position sensing device for use with a contol circuit for controlling the height position of a blade in the case of a motor grader includes a mechanical height-position sensor and a ultrasonic height-position sensor which are connected to a common control circuit via a switch.

2 Claims, 3 Drawing Sheets

HEIGHT SENSING DEVICE INCLUDING AN ULTRASONIC SENSOR AND A MECHANICAL SENSOR

FIELD OF THE INVENTION

The present invention refers to a height-position sensing device for use with a control circuit for controlling the height position of a blade in the case of a motor grader.

BACKGROUND OF THE INVENTION

A known height position sensing device for use with a control circuit for controlling the height position of a blade in the case of a motor grader exclusively consists of a mechanical height-position sensor for determining, by means of monitoring, the height relative to a height reference defined by a tight rope extending along the surface to be graded by the motor grader. In the case of this known height-position sensing device, the rope is monitored by a feeler tube or by a feeler arm whose angular position, which depends on the relative height with respect to the rope, is detected by a transformer and converter into a signal indicative of the height. The monitoring of the rope can only provide a reference height for a first strip which is parallel to the rope and which is graded by the motor grader in a first working cycle. When additional strips are produced, control of the height position of the blade must be effected with reference to the configuration of the just finished first strip extending on the ground. For this purpose, a feeler ski equipped with a further mechanical height-position sensor is provided, said feeler ski sliding on the just finished first strip so as to form a height reference when the next strip is being produced. This mechanical monitoring of the ground by means of a feeler ski which is supported such that it is vertically movable is complicated and sensitive by nature. In particular, the mechanical feeler ski limits the possible operating speed when the motor grader is in operation. Further limitations result from the fact that problems may arise due to the feeler ski when the motor grader is turning round or moving in the reverse direction.

It is true that, the field of construction machines, it is known to use also contactless systems for the purpose of distance measurement, said systems including in particular ultrasonic measuring systems, but, at least on the basis of the presently available technology, an ultrasonic distance measuring system is not suitable for reliably detecting the position of a reference rope so that such systems have hitherto not been used for controlling the height-position of the blade in the case of a motor grader.

SUMMARY OF THE INVENTION

In comparison with this prior art, the present invention is based on the task of further developing a height-position sensing device of the type mentioned at the beginning in such a way that, although the device is suitable for monitoring high-precision height references, such as a rope, it is still possible to carry out a height-position control with ground monitoring, one aim being to improve the reliability, robustness and simplicity of the whole height-position sensing device and another aim being to avoid limitations with regard to the driving direction and driving speed when working with the motor grader.

In addition, the height-position sensing device according to the invention should preferably fulfil the requirement that, in the case of the rope-monitoring mode of operation as well as in the case of the ground-monitoring mode of operation, it is possible to use only a single control circuit for adjusting the height position of the blade.

In accordance with the present invention, this task is solved by a height-position sensing device for use with a control circuit for controlling the height position of a blade in the case of a motor grader, comprising a mechanical height-position sensor, which is used for determining, by means of monitoring, the height relative to a height reference, in particular relative to a rope, and which produces a first signal indicative of the monitored height, said control circuit responding to said first signal for adjusting the height position of the blade, wherein the height-position sensing device is provided with an ultrasonic height-position sensor for carrying out acoustic transit-time determination of the height relative to a reference surface, and ultrasonic height-position sensor providing a second signal indicative of the height relative to the reference surface, and wherein said height-position sensing device is provided with a switching device which is adapted to be used for connecting the mechanical height-position sensor to the control circuit in its first switching position and the ultrasonic sensor to said control circuit in its second switching position.

In the case of the height-position sensing device according to the present invention, the control circuit is selectively connected to the mechanical height-position sensor as well as to the ultrasonic height-position sensor depending on the switching position of a switching device, which selectively supplies the first signal from said mechanical height-position sensor and the second signal from said ultrasonic height-position sensor—which are, consequently, signals of the same type—to the control circuit for adjusting the height position of the blade of the motor grader. On the basis of this combination of the mechanical height-position sensor and the ultrasonic height-position sensor, it is possible to use the same control circuit for employing—e.g. upon producing the first strip by means of the motor grader—a height control relative to a tight reference rope used as a height reference, whereupon a change-over to the ultrasonic height-position sensor is carried out when the next strip, which is disposed in spaced relationship with the first strip, is being produced, the output signal of said ultrasonic height-position sensor being now supplied to the control circuit for adjusting the height position of the blade of the motor grader. The invention is based on the finding that the lack of suitability of an ultrasonic height-position sensor for the purpose of monitoring the height reference rope normally used for producing the first strip need definitely not result in the necessity of realizing the whole height-position sensing device by means of a sensor having a purely mechanical mode of operation. In particular, due to the fact that e.g. the ultrasonic height-position sensor as well as the mechanical height-position sensor supply analogous voltage signals representative of the measured height, a single control circuit can be used, said control circuit being just selectively connected to one of the two sensors with the aid of the switching device.

The mechanical height-position sensor is preferably constructed as a transformer having an output voltage signal which depends on a rotational position of a rotary magnet arranged between an input coil and an output coil. This mode of construction, which is also referred to as RVDT sensor (rotational-variable-differential-transformer), shows the advantage of non-contacting rotational angle detection and, consequently, the advantage of a longer service life in comparison with a potentiometer, which is adapted to be used for such purposes as well.

It will be expedient when the rotary magnet is arranged between the input coil and the output coil of such a transformer in such a way that it influences the coupling degree between the coils in response to its rotational position.

A suitable ultrasonic height-position sensor for producing an output voltage signal proportional to the ultrasonic transit time and representative of the measured height comprises an ultrasonic transducer, an amplifier following said transducer, a rectifier stage following said amplifier and a sampling and hold circuit which follows said rectifier stage and which is used for producing an output voltage signal.

The ultrasonic height-position sensor is preferably constructed such that it comprises a power oscillator, which is connected to the ultrasonic transducer via a gate controlled by a monostable multivibrator, and that the monostable multivibrator is additionally connected to the amplifier so as to block said amplifier during the open condition of the gate.

A particularly simple operation of the height-position sensing device according to the present invention is achieved on the basis of the feature that the switching device for selectively connecting the mechanical height-position sensor and the ultrasonic height-position sensor to the control circuit is arranged in the driver's cab of the motor grader.

A particularly simple structural mounting of the height-position sensing device on the motor grader as well as robustness of said height-position sensing device are achieved on the basis of the feature that the mechanical height-position sensor and the ultrasonic height-position sensor are arranged in a common housing.

In the following, preferred embodiments of the height-position sensing device according to the present invention will be explained in detail while making reference to the accompanying drawings, in which FIG. 1 shows a perspective view of the height-position sensing device;

Figure 1:
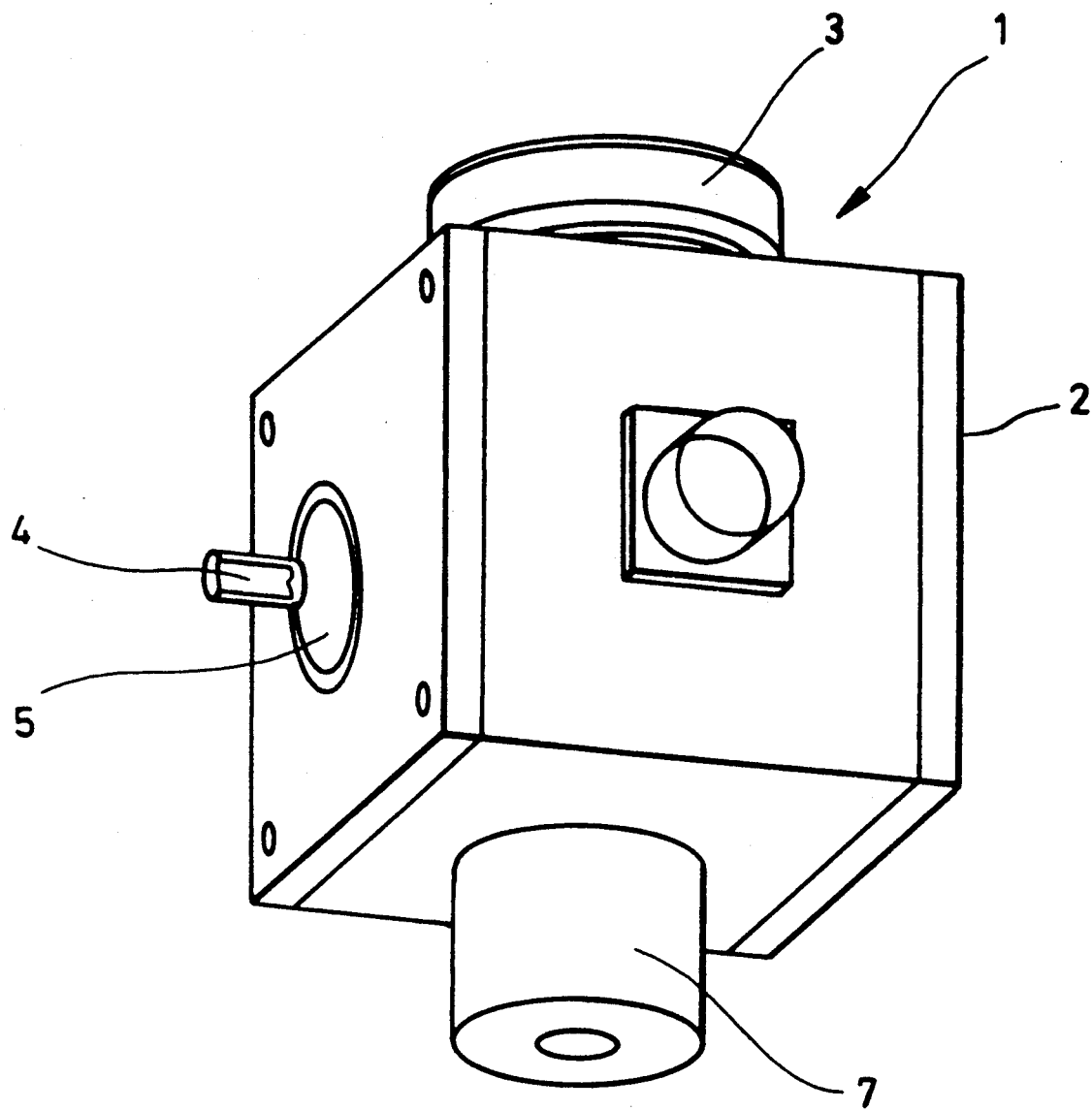

As can be seen in FIG. 1, the height-position sensing device according to the invention, which, as a whole, is provided with reference numeral 1, comprises a substantially cubic housing 2 the upper side of which is provided with a reception stud 3 by means of which the height-position sensing device can be secured to a motor grader (not shown). On the side of the housing 2 which is the left side in FIG. 1, a rotary shaft 4 of a mechanical height-position sensor 5 is positioned, said rotary shaft 4 being—in a manner known per se—adapted to have connected thereto a feeler arm or a feeler tube for monitoring a rope which is made of steel or of plastic material and which defines a height reference. A seven-terminal appliance coupler for connecting the height-position sensing device 1 according to the invention to a switching device as well as to a control circuit is positioned on the side shown in FIG. 1 as front side.

The lower side of the height-position sensing device has provided thereon an ultrasonic height-position sensor 7, which is adapted to be used for measuring the relative height of the height-position sensing device 1 either with respect to a previously deposited lane or with respect to a previously deposited strip of a lane or with respect to a kerbstone, gutter or a similar surface-like reference.

Figure 2:
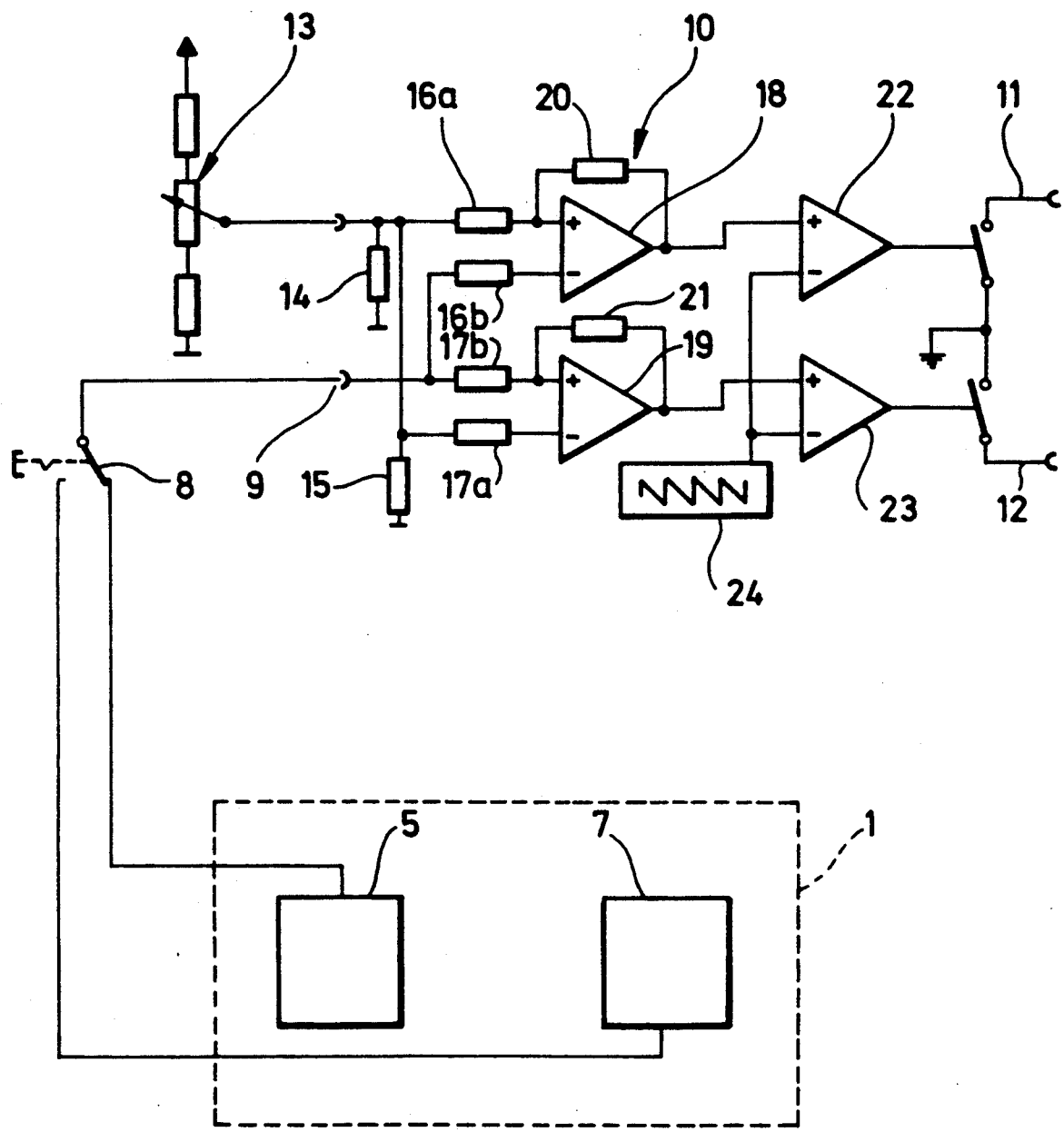
FIG. 2 shows a circuit design of a block diagram of the height-position sensing device together with the switching device and the control circuit.

In FIG. 2 it can be seen that the ultrasonic height-position sensor 7 and the mechanical height-position sensor 5 are connected to a switching device 8, which is preferable arranged in the driver's cab of the motor grader. The output of the switching device 8 is connected to an input terminal 9 of a control circuit, which, as a whole, is provided with reference numeral 10. The control circuit has two output terminals 11, 12, which—in a manner known per se—have connected thereto electrically actuable hydraulic valves for raising and lowering, respectively, the blade of the motor grader (not shown).

The control circuit 10 includes a voltage divider 13 by means of which a reference voltage can be variably adjusted, said reference voltage corresponding to the adjustment height of the blade of the motor grader. The variable voltage tapped off from the voltage divider 13 is connected to the non-inverting input of a first differential amplifier 18 and to the inverting input of a second differential amplifier 19, respectively, via a resistance network 14, 16a; 15, 17a. The inverting input of the first differential amplifier 18 is connected to the input terminal 9 of the control circuit 10 via a resistor 16b. In a similar manner, the non-inverting input of the second differential amplifier 19 is connected to the input terminal 9 of the control circuit 10 via the resistor 17b. Both differential amplifiers 18, 19 have a coupling resistor 20, 21 between their non-inverting input and their output, the respective output being connected to the non-inverting input of a first comparator 22 and of a second comparator 23, respectively. The comparators 22, 23 are connected to a triangular-signal generator 24 through their inverting inputs. When the input signal at the input terminal 9 corresponds to the reference voltage adjusted by the voltage divider 13, none of the two comparators 22, 23 will produce an output signal. When the input voltage exceeds the reference voltage, a pulse-length-modulated signal whose length corresponds to the input voltage difference will appear at the output of the second comparator 23. Accordingly, a pulse-length-modulated signal corresponding to the voltage difference will appear at the output of the first comparator 22 when the input voltage at the input terminal 9 is lower than the reference voltage provided by the voltage divider 13.

Figure 3:
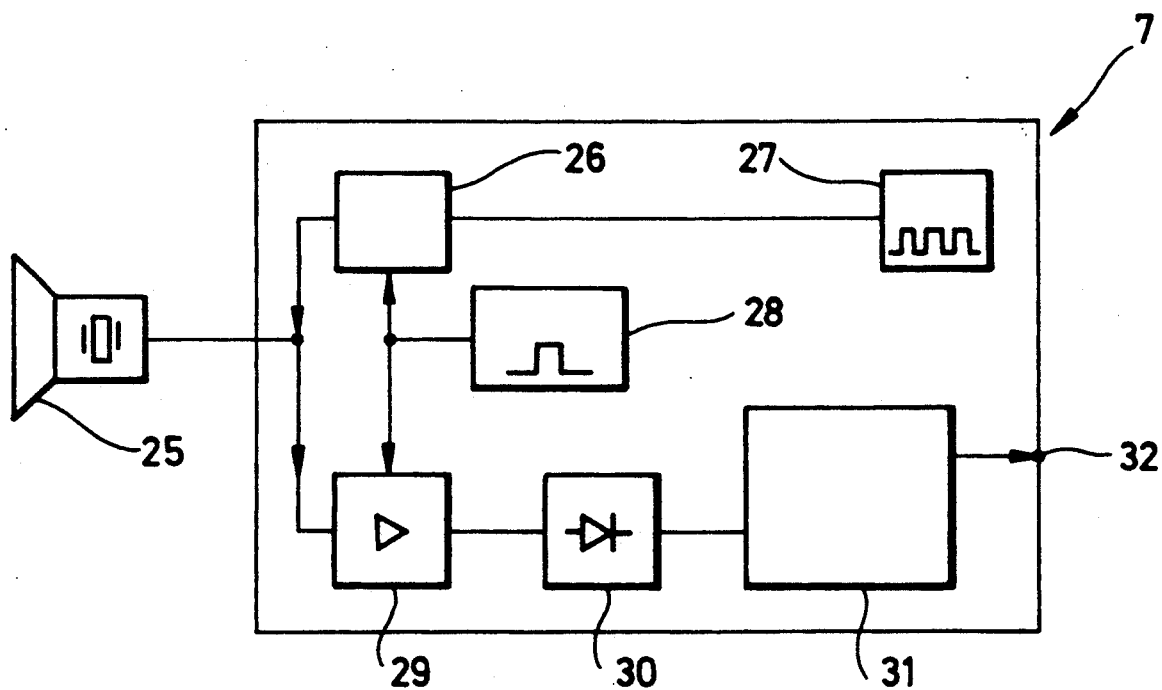
FIG. 3 shows a block diagram of the ultrasonic height-position sensor as used in the embodiments of FIG. 1 and 2.

As can be seen in FIG. 3, the ultrasonic height-position sensor 7 includes an ultrasonic transducer 25, which is adapted to be connected to a power oscillator 27 via a gate 26. When the gate is open, the ultrasonic transducer 25 will supply an ultrasonic signal. The opening period of the gate 26 is determined by a monostable multivibrator 28 connected to the gate. Furthermore, the ultrasonic transducer is connected to a sampling and hold circuit 31 via an amplifier 29 and a rectifier stage 30. The amplifier 29 is controlled by the monostable multivibrator 28 in such a way that said amplifier 29 is deactivated during the opening period of the gate 26. At the output 32 of the sampling and hold circuit voltage signal is produced, which is proportional to the ultrasonic transit time and, consequently, to the height position.

Figure 4:
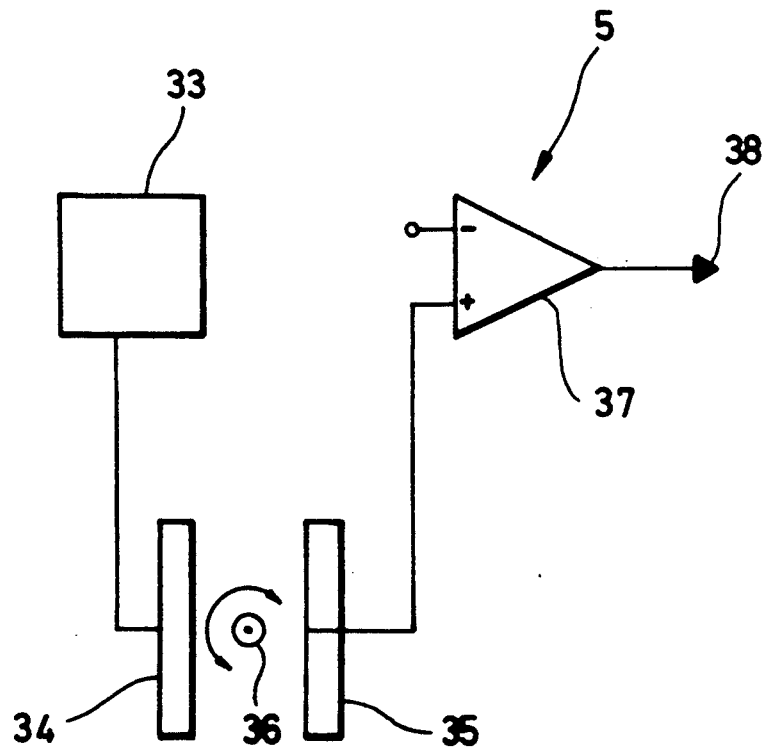
FIG. 4 shows a block diagram of the mechanical height-position sensor which is used in the embodiments according to FIG. 1 and 2 as well.

As can be seen in FIG. 4, the mechanical height-position sensor 5 includes an oscillator 33, which excites an input coil 34. The coupling degree between this input coil 34 and an output coil 35 depends on the rotational position of a rotary magnet 36, which is rotatably arranged between the two coils 34, 35 and which is connected to the rotary shaft 4 of the mechanical height-position sensor 5. The output coil 35 is connected to the non-inverting input of an amplifier 37 whose non-inverting input has applied thereto a reference voltage. The output voltage of the amplifier 37, which can be smoothed and rectified, if necessary, appears at an output terminal 38.

Deviating from the embodiment shown, it is also possible to use other types of mechanical height-position sensors and ultrasonic sensors as long as they produce output signals of the same type so that the output signals can be processed by a common control circuit 10.

The control circuit 10 need not carry out pulse-length modulation, but it can also effect some other suitable proportional control of the hydraulic valves.

We claim:

1. A method for grading a plurality of surfaces utilizing a motor grader that can be operated to create a graded surface relative to a chosen height reference, the motor grader including a blade for contacting the ground, a switch in a driver's cab, said switch having first and second positions, a height sensing device for determining the height of the blade relative to the height reference, the height sensing device including a mechanical height-position sensor for determining mechanically the height of the blade relative to an initial height reference provided by a tight rope and generating a first electrical height signal, the height sensing device further including an ultrasonic height-position sensor providing ultrasonic signals which are used for determining the height of the blade relative to a graded surface extending on the ground, at which the ultrasonic sensor is aimed, and generating a second electric height signal corresponding to the determined height, a control circuit responsive to the first and second positions of the switch for respectively selecting either the first or second electric height signal as a height sensing device output, the motor grader further including electrically hydraulic valves responsive to the height sensing device output for raising and lowering the blade, said method comprising the steps of:
   extending a tight rope defining an initial height reference,
   setting the switch to the first position,
   operating the motor grader using the first electrical height signal at the height sensing device output to control the blade height relative to the tight rope, thereby creating a first graded surface,
   setting the switch to the second position, and
   aiming the ultrasonic signals at the first graded surface and operating the motor grader using the second electrical height signal as the height sensing device output to control the blade heights relative to the first graded surface, thereby creating a second graded surface.

2. The method of claim 1 including the further step of maintaining the switch in the second position and repeatedly operating the motor grader with the ultrasonic signals aimed at a previously created graded surface thereby creating at least one graded surface beyond the second graded surface.

* * * * *